(12) United States Patent
Hung et al.

(10) Patent No.: US 12,046,408 B2
(45) Date of Patent: *Jul. 23, 2024

(54) ELECTRONIC DEVICE AND THE METHOD TO MAKE THE SAME

(71) Applicant: CYNTEC CO., LTD., Hsinchu (TW)

(72) Inventors: Shuen-Chang Hung, Taoyuan (TW); Min-Feng Chung, Taichung (TW)

(73) Assignee: CYNTEC CO., LTD., Hsinchu (TW)

( * ) Notice: Subject to any disclaimer, the term of this patent is extended or adjusted under 35 U.S.C. 154(b) by 6 days.

This patent is subject to a terminal disclaimer.

(21) Appl. No.: 17/584,333

(22) Filed: Jan. 25, 2022

(65) Prior Publication Data

US 2022/0148793 A1    May 12, 2022

Related U.S. Application Data

(63) Continuation of application No. 16/245,259, filed on Jan. 11, 2019, now Pat. No. 11,270,834.

(60) Provisional application No. 62/616,444, filed on Jan. 12, 2018.

(51) Int. Cl.
*H01F 27/28* (2006.01)
*H01F 27/29* (2006.01)
*H01F 27/32* (2006.01)
*H01F 27/36* (2006.01)
*H01F 38/14* (2006.01)
(Continued)

(52) U.S. Cl.
CPC ....... *H01F 27/288* (2013.01); *H01F 27/2804* (2013.01); *H01F 27/2823* (2013.01); *H01F 27/2866* (2013.01); *H01F 27/2885* (2013.01); *H01F 27/29* (2013.01); *H01F 27/32* (2013.01); *H01F 27/36* (2013.01); *H01F 38/14* (2013.01); *H01F 41/06* (2013.01); *H02J 50/10* (2016.02); *H01F 27/2871* (2013.01)

(58) Field of Classification Search
CPC ............... H01F 27/288; H01F 27/2804; H01F 27/2823; H01F 27/2866; H01F 27/2885; H01F 27/29; H01F 27/32; H01F 27/36; H01F 38/14; H01F 41/06; H01F 27/2871; H01F 27/2847; H01F 27/2852; H01F 27/34; H01F 27/361; H01F 41/00; H01F 41/04; H01F 2027/348; H02J 50/10
See application file for complete search history.

(56) References Cited

U.S. PATENT DOCUMENTS 5,551,146 A * 9/1996 Kawabata ............... H01F 17/04
                                                                  336/83
5,917,244 A * 6/1999 Lee ......................... H01L 28/10
                                                                  257/E21.174

(Continued)

FOREIGN PATENT DOCUMENTS

CN    107171446 A  *  9/2017  ............. F16M 13/04
JP    H10125860 A  *  5/1998
(Continued)

*Primary Examiner* — Daniel Kessie
*Assistant Examiner* — Brian K Baxter
(74) *Attorney, Agent, or Firm* — Min-Lee Teng

(57) ABSTRACT

A shielding layer that is made of conductive and magnetic material is used to encapsulate the bare metal wire of a coil of an inductor to shield the coil from the external magnetic field and make the resistance and the power loss of the inductor lower.

8 Claims, 15 Drawing Sheets

(51) Int. Cl.
*H01F 41/06* (2016.01)
*H02J 50/10* (2016.01)

(56) References Cited

U.S. PATENT DOCUMENTS

| | | | | |
|---|---|---|---|---|
| 8,729,855 | B2* | 5/2014 | Kobayashi | H02J 50/10 |
| | | | | 320/108 |
| 10,224,984 | B1* | 3/2019 | Li | H04B 5/0037 |
| 10,546,684 | B2* | 1/2020 | Huang | H01F 17/06 |
| 11,270,834 | B2* | 3/2022 | Hung | H01F 27/32 |
| 2001/0004136 | A1* | 6/2001 | Ikeda | G06K 19/0775 |
| | | | | 257/778 |
| 2003/0080845 | A1* | 5/2003 | Fontanella | H01F 17/0006 |
| | | | | 257/E27.005 |
| 2008/0191829 | A1* | 8/2008 | Lee | H01F 17/0006 |
| | | | | 336/170 |
| 2009/0243780 | A1* | 10/2009 | Inoue | H01L 23/645 |
| | | | | 336/200 |
| 2011/0227421 | A1* | 9/2011 | Sakoda | B60L 53/12 |
| | | | | 307/104 |
| 2012/0038445 | A1* | 2/2012 | Finn | G06K 19/07783 |
| | | | | 336/105 |
| 2013/0020877 | A1* | 1/2013 | Miller | H02J 7/00034 |
| | | | | 977/932 |
| 2013/0249302 | A1* | 9/2013 | An | H02J 50/10 |
| | | | | 307/104 |
| 2014/0328027 | A1* | 11/2014 | Zhang | H01F 5/00 |
| | | | | 361/728 |
| 2016/0055954 | A1* | 2/2016 | Huang | H01F 17/06 |
| | | | | 336/83 |
| 2016/0133374 | A1* | 5/2016 | Inui | H01F 27/292 |
| | | | | 336/192 |
| 2016/0344223 | A1* | 11/2016 | Lee | H02J 7/0044 |
| 2017/0005046 | A1* | 1/2017 | Sin | H01L 27/0694 |
| 2017/0040694 | A1* | 2/2017 | Singh | H01F 27/38 |
| 2017/0040830 | A1* | 2/2017 | Jang | H01F 27/288 |
| 2017/0094727 | A1* | 3/2017 | Saunamäki | H02J 50/12 |
| 2017/0365402 | A1* | 12/2017 | Fukushima | H01F 27/2804 |
| 2018/0047493 | A1* | 2/2018 | Yang | H01F 27/292 |
| 2018/0082775 | A1* | 3/2018 | Shimoichi | H01F 27/327 |
| 2019/0221359 | A1* | 7/2019 | Hung | H01F 38/14 |
| 2020/0118735 | A1* | 4/2020 | Huang | H01F 27/292 |
| 2020/0251277 | A1* | 8/2020 | Lin | H01F 27/34 |
| 2020/0303107 | A1* | 9/2020 | Chung | H01F 41/076 |
| 2021/0134514 | A1* | 5/2021 | Sheng | H01F 41/041 |
| 2021/0225576 | A1* | 7/2021 | Kim | H01F 27/2828 |

FOREIGN PATENT DOCUMENTS

| | | | | |
|---|---|---|---|---|
| WO | WO-2016190708 A1 | * | 12/2016 | H01F 38/14 |
| WO | WO-2018021623 A1 | * | 2/2018 | C09J 11/04 |

* cited by examiner

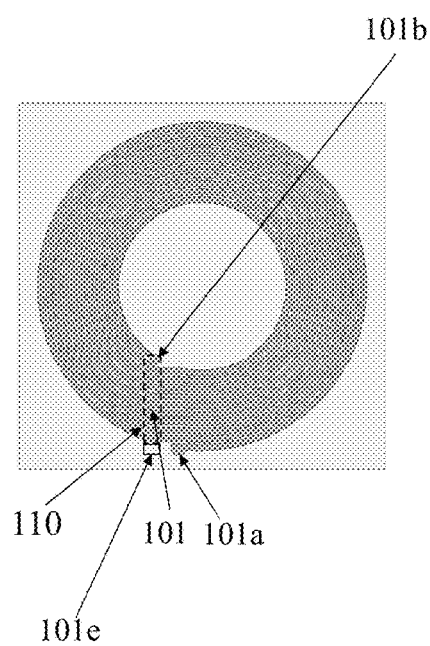
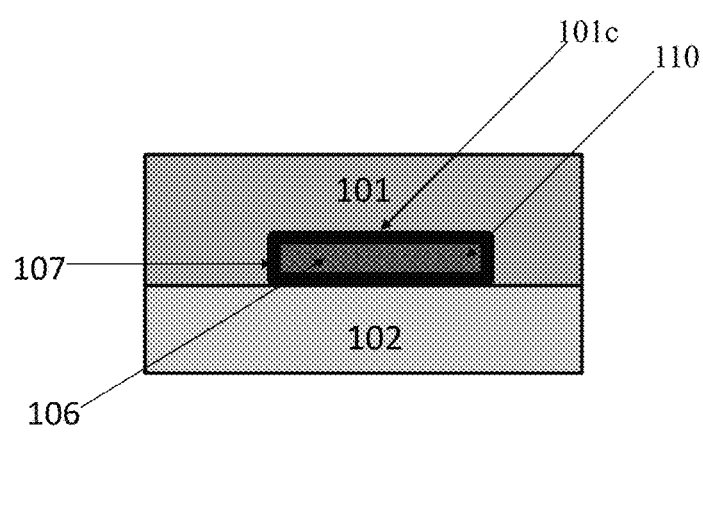
FIG. 2A
FIG. 2B

| removing unwanted portions of a metal plate to form a coil comprising a plurality of winding turns of the coil        401 |

| forming a shielding layer comprising a first conductive and magnetic material to encapsulate each of the plurality of winding turns of the coil        402 |

| forming a molding body or an encapsulating layer comprising a second magnetic material to encapsulate the plurality of winding turns of the coil and the shielding layer        403 |

FIG. 4

| Model \ Items | Inductance (uH) | DCR (60Hz) mΩ | ACR (100 kHz) mΩ | Q=wL/ACR (100 kHz) | ACR (326kHz) mΩ | Q=wL/ACR (326 kHz) | Copper Cross section (mm*mm) | Pitch (mm) |
|---|---|---|---|---|---|---|---|---|
| No Shielding | 2.35 | 135.0 | 150.4 | 9.82 | 205.5 | 23.4 | 1.50*0.07 | 0.3 |
| Plated Nickel | 2.45 | 133.0 | 143.9 | 10.70 | 161.6 | 31.1 | 150*0.07 | 0.3 |

FIG. 5

ELECTRONIC DEVICE AND THE METHOD TO MAKE THE SAME

CROSS-REFERENCE TO RELATED APPLICATIONS

This application is a Continuation of application Ser. No. 16/245,259 filed on Jan. 11, 2019, which claims the benefit of Provisional Application No. 62/616,444 filed on Jan. 12, 2018, wherein each of which is hereby incorporated by reference herein and made a part of the specification.

BACKGROUND OF THE INVENTION

I. Field of the Invention

The present invention relates to an electronic device, and in particular, to an inductor.

II. Description of Related Art

Conventional inductors cannot prevent the proximity effect caused by an external magnetic field when there is a current passing through it at an operating frequency, especially when the conventional inductor is used in a receiver of a wireless charger. Finding a way to decrease the proximity effect of the inductor becomes a crucial issue, especially when the inductor is used in a wireless charger.

Therefore, a solution is needed to decrease the proximity effect of the inductor, especially when the inductor is used in a wireless charger.

SUMMARY OF THE INVENTION

One objective of the present invention is to add a shielding layer comprising a conductive and magnetic material to encapsulate the bare metal wire of a coil so as to shield the coil from the external magnetic field and make the resistance or ACR (alternating current resistance) of the coil lower.

One objective of the present invention is to form two electrodes of an inductor so that the two electrodes of the inductor can be placed side by side for electrically connecting with an external circuit.

One objective of the present invention is to dispose a plurality of separated graphene sheets over the bottom surface of an inductor so as to reduce eddy currents and the power loss of the inductor.

In one embodiment of the present invention, an electronic device is disclosed, wherein the electronic device comprises: a coil, wherein the coil comprises a plurality of winding turns of a bare metal wire; and a shielding layer comprising a first conductive and magnetic material to encapsulate each of the plurality of winding turns of the coil.

In one embodiment, the first conductive and magnetic material comprises nickel (Ni).

In one embodiment, the electronic device is an inductor.

In one embodiment, the electronic device is a receiver of a wireless charger.

In one embodiment, the coil is formed by removing unwanted portions of a metal plate.

In one embodiment, the metal plate comprises copper.

In one embodiment, the metal plate is a copper plate.

In one embodiment, the shape of a cross-section of each winding turn in the thickness direction of the coil is rectangular, and the total thickness of the coil and the shielding layer is about 0.1 mm, or in a range: 0.08 mm-0.12 mm.

In one embodiment, a second magnetic and adhesive material encapsulates the shielding layer and the coil. In one embodiment, the second magnetic and adhesive material is a magnetic glue.

In one embodiment, an encapsulating layer or a molding body encapsulates the shielding layer and the coil and extends into the hollow space of the coil.

In one embodiment, the encapsulating layer or the molding body comprises a magnetic material.

In one embodiment, the encapsulating layer or the molding body comprises ferrite.

In one embodiment, a plurality of separated graphene sheets are disposed over the bottom surface of the encapsulating layer. In one embodiment, the plurality of separated graphene sheets are entirely made of graphite.

In one embodiment, a vertical straight line passes the center of the coil and a gap between the plurality of separated graphene sheets.

In one embodiment, the first conductive and magnetic material is made of nickel (Ni).

In one embodiment, the inductor is used in a wireless charger, wherein the operating frequency of the inductor ranges from 100 kHz to 400 KHz.

In one embodiment, the thickness of the shielding layer made of nickel (Ni) is in a range of 1.5 um to 15 um.

In one embodiment, the thickness of the shielding layer made of nickel (Ni) is in a range of 5 um to 15 um.

In one embodiment, the thickness of the shielding layer made of nickel (Ni) is in a range of 10 um to 14 um.

In one embodiment, the thickness of a winding turn of the coil is in a range of 50 um to 200 um, wherein the thickness of the shielding layer is in a range of 1.5 um to 20 um.

In one embodiment, the thickness of a winding turn of the coil is in a range of 50 um to 100 um, wherein the thickness of the shielding layer is in a range of 1.5 um to 15 um.

In one embodiment, the thickness of a winding turn of the coil is in a range of 60 um to 80 um, wherein the thickness of the shielding layer is in a range of 1.5 um to 10 um.

In one embodiment, the inductor is used in a wireless charger, wherein the operating frequency of the inductor is about 6.78 MHz.

In one embodiment, the inductor comprises a first electrode and a second electrode, wherein the first electrode is electrically connected to the outermost terminal part of the coil pattern, and the second electrode is electrically connected to the innermost terminal part of the coil pattern via a conductive part disposed across the plurality of winding turns.

In one embodiment, the conductive part comprises a terminal part of the coil.

In one embodiment, the conductive part comprises a metal lead.

In one embodiment, the conductive part comprises a lead frame that is encapsulated by tin.

In one embodiment, for each two adjacent winding turns of the plurality of winding turns, the width of the inner winding turn is less than that of the outer winding turn.

In one embodiment, the plurality of winding turns are nine winding turns, wherein the width of each of the innermost two winding turns and the outermost winding turn is half of the width of each of the other winding turns.

In one embodiment of the present invention, an electronic device is disclosed, wherein the electronic device comprises: a coil, formed by removing unwanted portions of a metal plate, wherein the coil comprises a plurality of winding turns; and a first electrode and a second electrode, wherein the first electrode is electrically connected to the outermost terminal part of the coil, and the second electrode is electrically connected to the innermost terminal part of the coil via a conductive part disposed across the plurality of winding turns, so that the first electrode and the second electrode can be placed side by side at the outmost side of the coil for electrically connecting with an external circuit.

In one embodiment of the present invention, an electronic device is disclosed, wherein the electronic device comprises: a coil, wherein the coil comprises a plurality of winding turns: and a plurality of separated graphene sheets, disposed over the bottom surface of the coil for reducing eddy currents, wherein a vertical straight line passes the center of the coil and a gap between the plurality of separated graphene sheets.

In one embodiment of the present invention, a method for forming an electronic device comprising a coil is disclosed, wherein the method comprises: providing a coil comprising a plurality of winding turns of a bare metal wire; and using a first conductive and magnetic material to encapsulate the coil.

In one embodiment of the present invention, a method for forming an electronic device is disclosed, wherein the method comprises: removing unwanted portions of a metal plate to form a coil comprising a plurality of winding turns of the coil: forming a shielding layer comprising a first conductive and magnetic material to encapsulate each of the plurality of winding turns of the coil: and using a second magnetic and adhesive material to encapsulate the plurality of winding turns of the coil and the shielding layer.

In one embodiment of the present invention, a method for forming an electronic device is disclosed, wherein the method comprises: removing unwanted portions of a metal plate to form a coil comprising a plurality of winding turns: and using a first conductive and magnetic material to encapsulate the coil.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A illustrates how a recess is formed on a top or bottom surface of a coil for connecting the inner terminal of the coil to a corresponding electrode according to one embodiment of the present invention:

FIGS. 2B-2E each illustrate how to connect the inner terminal of the coil to the corresponding electrode via the recess shown in FIG. 2A according to one embodiment of the present invention:

FIG. 4 depicts a flow chart of a method for forming an inductor according to another embodiment of the present invention;

FIG. 5 illustrates a chart to compare an inductor without the shielding layer with an inductor that is coated with the shielding layer made of nickel.

DESCRIPTION OF EMBODIMENTS

In an inductive wireless charger, the operating frequency ranges from 100 KHz to 400 kHz; in a resonance type, the operating frequency is closer to 6.78 MHz, wherein the thickness of a metal conductor of a coil is smaller than the skin depth, which means that the skin effect is rather small. Therefore, how to decrease the proximity effect that is based on the external magnetic field becomes a crucial issue. The present invention encapsulates the metal conductor of the coil with a conductive and magnetic material so as to shield the coil from the external magnetic field and make the ACR of the coil lower.

In one embodiment of the present invention, a receiver of a wireless charger comprising a coil is provided, the formula of the Q value of the receiver of the wireless charger is as below:

$$Q = \frac{\omega L}{R_s}$$

where w is the angular frequency ($\omega=2*\pi*f$, f is the frequency in hertz), L is the inductance of the receiver of the wireless charger, and $R_s$ is the resistance at the operating frequency. The present invention encapsulates a metal wire of the coil with a conductive and magnetic material, such as Nickel (Ni), so that the ACR of the coil can be decreased effectively so as to promote the Q value of the receiver of the wireless charger.

Figure 1A:
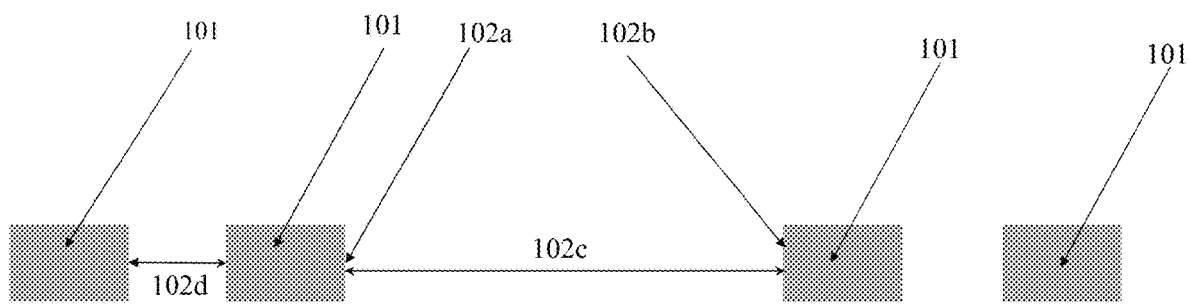
FIG. 1A depicts a cross-section view of winding turns in the thickness direction of a coil according to one embodiment of the present invention.

FIG. 1A depicts a cross-section view of a winding turn in the thickness direction of a coil, wherein the coil comprises a plurality of winding turns 101 of a metal wire, wherein the central hollow space 102c of the coil has a distance 102c between the two innermost portions 102a, 102b of the coil, wherein each two adjacent winding turns has a gap 102d. In one embodiment, the width of the gap 102c between two adjacent winding turns is in a range of 0.1 mm to 0.5 mm; in one embodiment, the width of the gap 102c between two adjacent winding turns is in a range of 0.2 mm to 0.4 mm.

In one embodiment, the coil is formed by removing unwanted portions of a metal plate, such as a copper plate, by ways such as etching out and/or punching out the unwanted portions of the metal plate, wherein each two adjacent winding turns are separated by a horizontal gap.

Figure 1B:
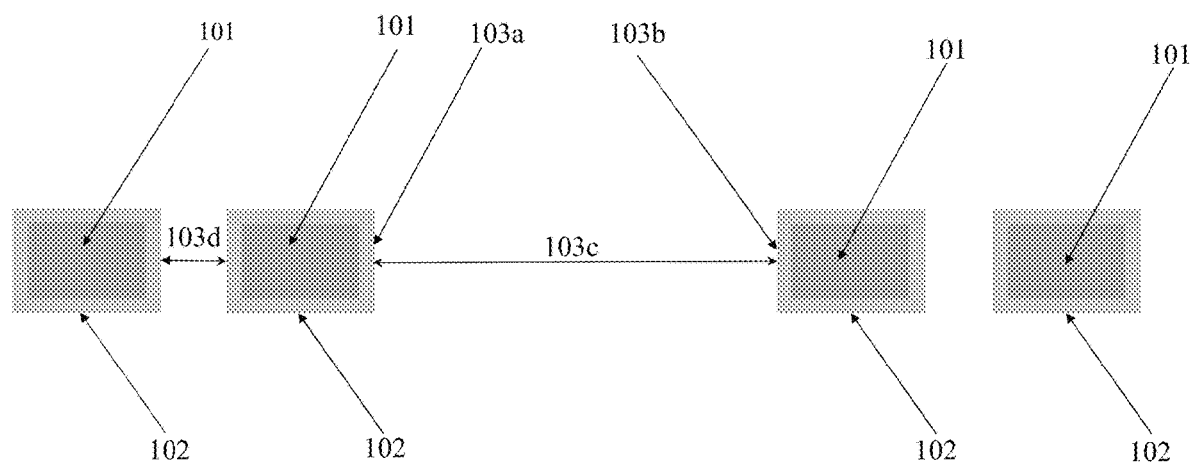
FIG. 1B depicts a cross-section view of winding turns in the thickness direction of a coil with an added shielding according to one embodiment of the present invention.

FIG. 1B depicts a cross-section view in the thickness direction of the coil shown in FIG. 1A with an added shielding layer, wherein the coil comprises a plurality of winding turns 101 of a metal wire; and a shielding layer 102, which is made of a conductive and magnetic material, to encapsulate each of the plurality of winding turns 101 of the coil, wherein the central hollow space of the shielded coil has a distance 103c between the two innermost portions 103a, 103b of the shielding layer 102, wherein each two adjacent shielded winding turns has a gap 103d. In one embodiment, the thickness of the shielding layer 102 is in a range of 1.0 um to 10 um. In one embodiment, the thickness of the shielding layer 102 is in a range of 1.0 um to 5 um. In one embodiment, the thickness of the shielding layer 102 is in a range of 1.0 um to 3 um.

Figure 1C:
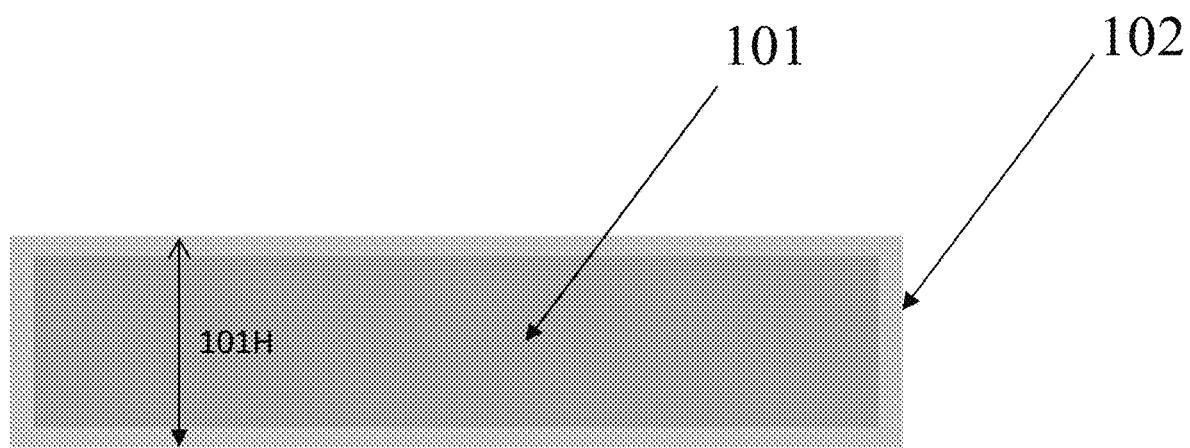
FIG. 1C depicts a cross-section view of a winding turn in the thickness direction of a coil according to one embodiment of the present invention.

FIG. 1C depicts a cross-section view of a winding turn in the thickness direction of a coil according to one embodiment of the present invention. As shown in FIG. 1C, the shape of a cross-section view of a winding turn in the thickness direction of a coil is rectangular. In one embodiment, the total thickness 101H of the winding turn 101 and the shielding layer 102 is about 0.1 mm. In one embodiment, the total thickness 101H of the winding turn 101 and the shielding layer 102 ranges from 0.8 mm to 1.2 mm.

In one embodiment of the present invention, the first conductive and magnetic material comprises nickel (Ni).

In one embodiment, the first conductive and magnetic material is made of nickel (Ni).

In one embodiment of the present invention, for each two adjacent winding turns of the plurality of winding turns, the width of the inner winding turn of the two adjacent winding turns is less than that of the outer winding turn of the two adjacent winding turns.

In one embodiment of the present invention, the width of each of the innermost two winding turns of the coil and the outermost winding turn of the coil is half of the width of each of the other winding turns of the coil.

In one embodiment of the present invention, the plurality of winding turns of the coil are nine winding turns, wherein the width of each of the innermost two winding turns of the coil and the outermost winding turn of the coil is half of the width of each of the other winding turns.

In one embodiment, a magnetic and adhesive material, such as a magnetic glue, encapsulates the coil and the shielding layer 102.

In one embodiment of the present invention, the shape of a cross-section of each winding turn in the thickness direction of the coil is rectangular, and the total thickness of the coil and the shielding layer is about 0.1 mm.

In one embodiment of the present invention, the inductor is used in a wireless charger, wherein the operating frequency of the inductor ranges from 100 kHz to 400 KHz.

In one embodiment of the present invention, the inductor is used in a wireless charger, wherein the operating frequency of the inductor is about 6.78 MHZ.

In one embodiment, the inductor comprises a first electrode and a second electrode, wherein the first electrode is electrically connected to the outermost terminal part of the coil, and the second electrode is electrically connected to the innermost terminal part of the coil pattern via a conductive part disposed across the plurality of winding turns.

In one embodiment, the conductive part comprises a terminal part of the coil.

In one embodiment, the conductive part comprises a metal lead.

In one embodiment, the conductive part comprises a lead frame that is encapsulated by tin.

Please refer to FIG. 2A and FIG. 2B. As shown in FIG. 2A, the coil comprises a plurality of winding turns 101 and an outer ending part 101a and an inner ending part 101b, wherein the second terminal 101b is located at inner side of the coil. As shown in FIG. 2A, the outer ending part 101a is located at the outmost side of the coil and therefore it can be easily be used for forming a first electrode of the inductor. However, the inner ending part 101b is located at inner side of the coil, and it is not desired to form a second electrode at the innermost side of the coil since it will be difficult to connect with an external circuit. In order to bring the second electrode to the outmost side of the coil, a recess 110 can be formed on a top or a bottom surface of the plurality of winding turns 101 so that an insulating layer 107 and a conductive part 106 can be placed in the recess 110, as shown in FIG. 2B.

FIG. 2B shows a cross-section view of a winding turn of the plurality of winding turns 101 and the shielding layer 102, wherein the recess 110 is formed on a bottom surface of the plurality of winding turns 101, the insulating layer 107 is disposed in the recess 110, and the conductive part 106 is disposed on the insulating layer 107, wherein one end of the conductive part 106 can be used to electrically connect to the second terminal 101b and the other end of the conductive part 106 can be used to electrically connect with a second electrode 101e of the inductor. By doing so, the maximum height of the coil can remain the same.

Figure 2C:
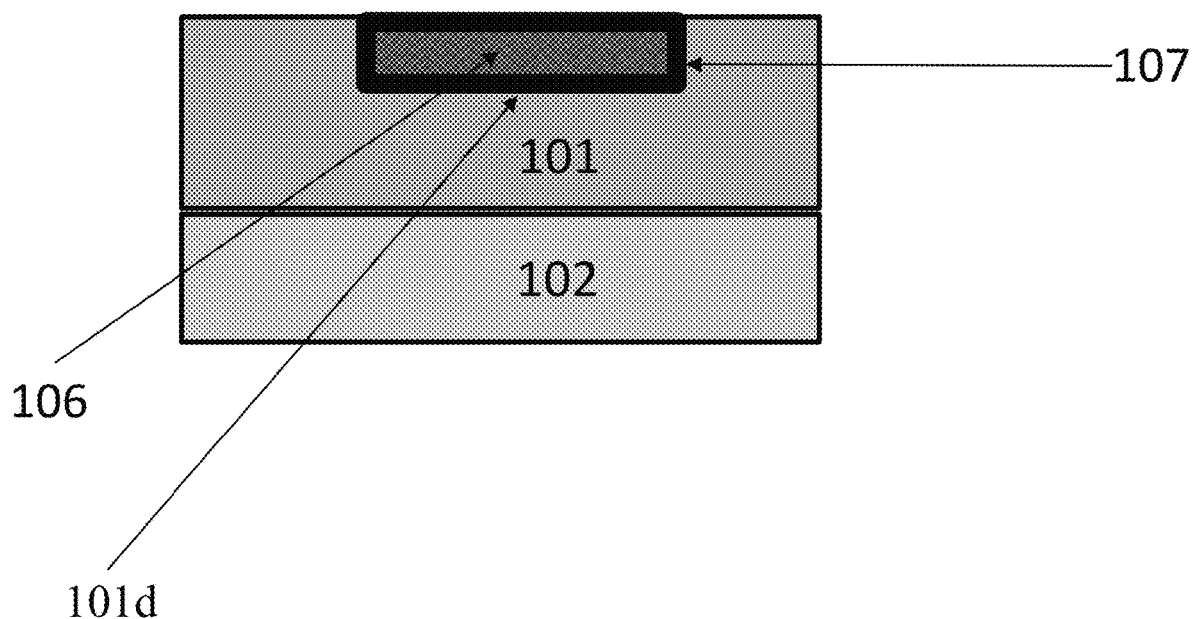

Please refer to FIG. 2A and FIG. 2C. FIG. 2C shows a cross-section view of a winding turn of the plurality of winding turns 101 and the shielding layer 102, wherein the recess 110 is formed on a top surface of the plurality of winding turns 101, the insulating layer 107 is disposed in the recess 110, and the conductive part 106 is disposed on the insulating layer 107, wherein one end of the conductive part 106 can be used to electrically connect to the second terminal 101b and the other end of the conductive part 106 can be used to electrically connect with the second electrode 101e of the inductor. By doing so, the maximum height of the coil can remain the same.

In one embodiment of the present invention, the inductor comprises a first electrode and a second electrode, wherein the first electrode is electrically connected to the outermost terminal part of the coil pattern, and the second electrode is electrically connected to the innermost terminal part of the coil pattern via a conductive part disposed across the plurality of winding turns.

Figure 2D:
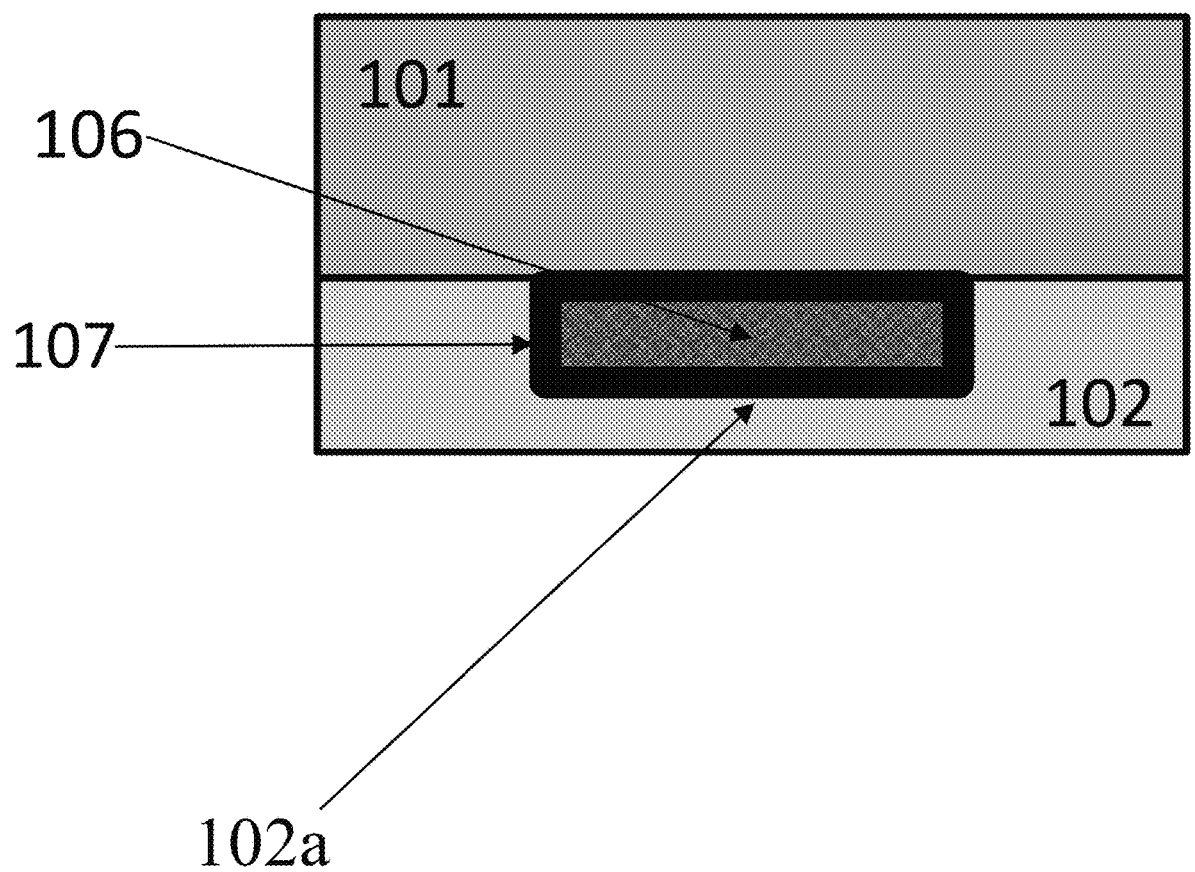

Please refer to FIG. 2A and FIG. 2D. FIG. 2D shows a cross-section view of a winding turn of the plurality of winding turns 101 and the shielding layer 102, wherein the recess 110 is formed on a top surface of the shielding layer 102, the insulating layer 107 is disposed in the recess 110, and the conductive part 106 is disposed on the insulating layer 107, wherein one end of the conductive part 106 can be used to electrically connect to the second terminal 101b and the other end of the conductive part 106 can be used to electrically connect with the second electrode 101e of the inductor. By doing so, the maximum height of the coil and the shielding layer 102 can remain the same.

Figure 2E:
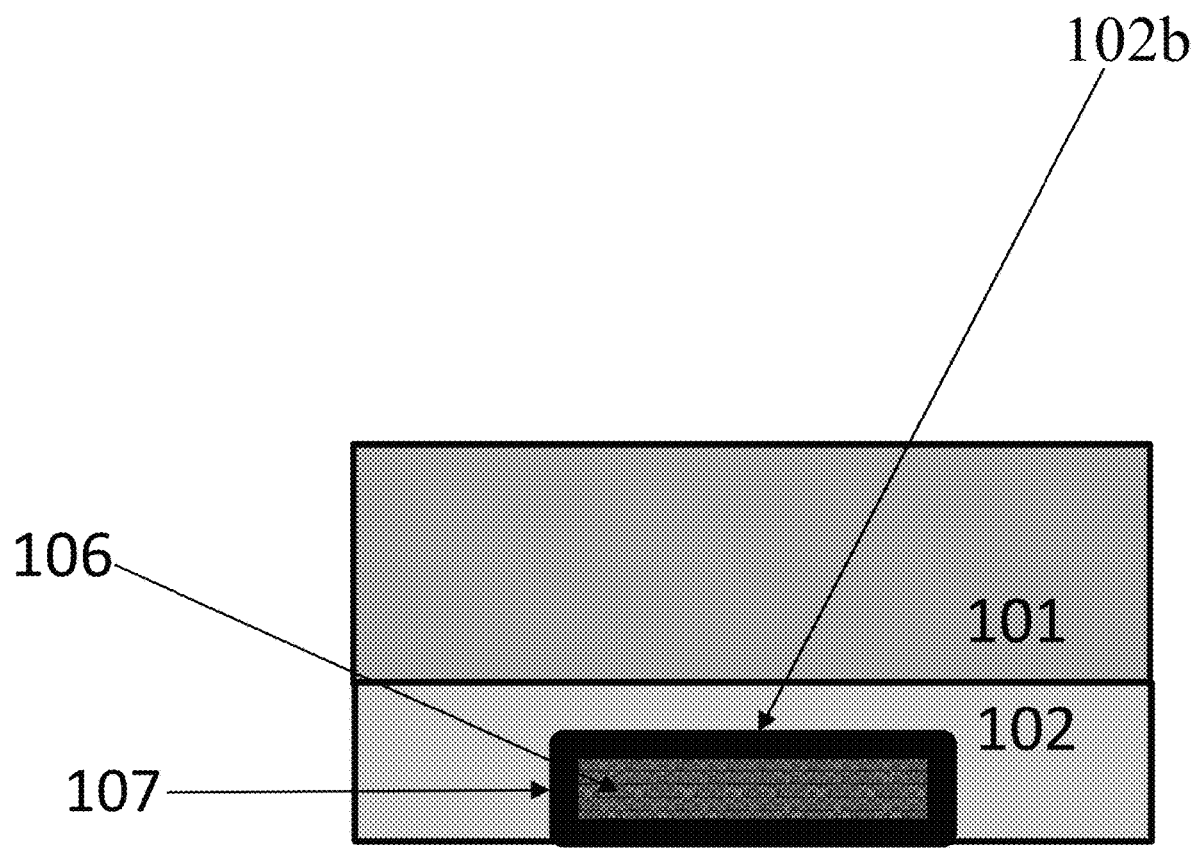

Please refer to FIG. 2A and FIG. 2E. FIG. 2E shows a cross-section view of a winding turn of the plurality of winding turns 101 and the shielding layer 102, wherein the recess 110 is formed on a bottom surface of the shielding layer 102, the insulating layer 107 is disposed in the recess 110, and the conductive part 106 is disposed on the insulating layer 107, wherein one end of the conductive part 106 can be used to electrically connect to the second terminal 101*b* and the other end of the conductive part 106 can be used to electrically connect with the second electrode 101*e* of the inductor. By doing so, the maximum height of the coil and the shielding layer 102 can remain the same.

Figure 2F:
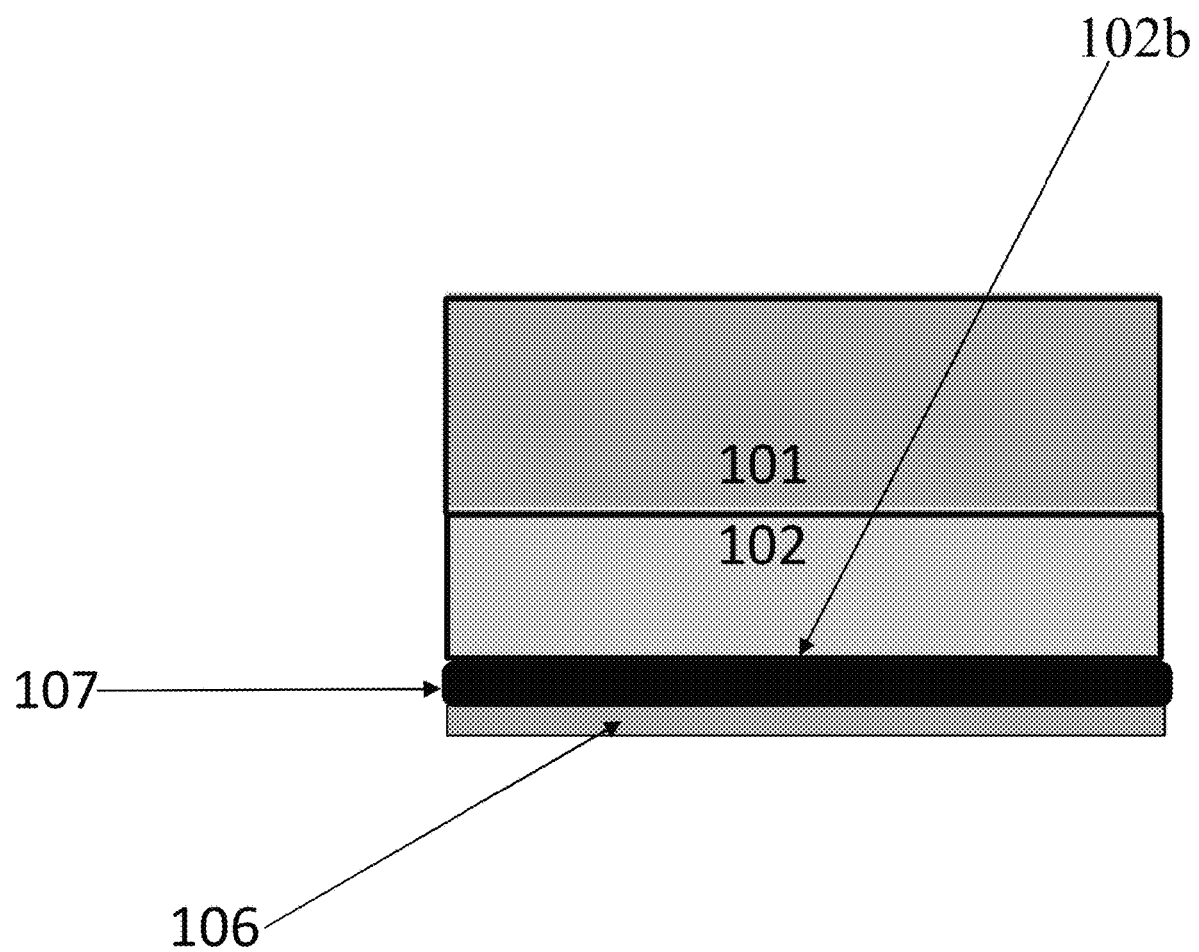
FIGS. 2F-2G each illustrate how to connect the inner terminal of the coil to the corresponding electrode without using the recess shown in FIG. 2A according to another embodiment of the present invention.

Please refer to FIG. 2F. FIG. 2F shows a cross-section view of a winding turn of the plurality of winding turns 101 and the shielding layer 102, wherein the insulating layer 107 is disposed on a bottom surface of the shielding layer 102, and the conductive part 106 is disposed on the insulating layer 107, wherein one end of the conductive part 106 can be used to electrically connect to the second terminal 101*b* and the other end of the conductive part 106 can be used to electrically connect with the second electrode 101*e* of the inductor.

Figure 2G:
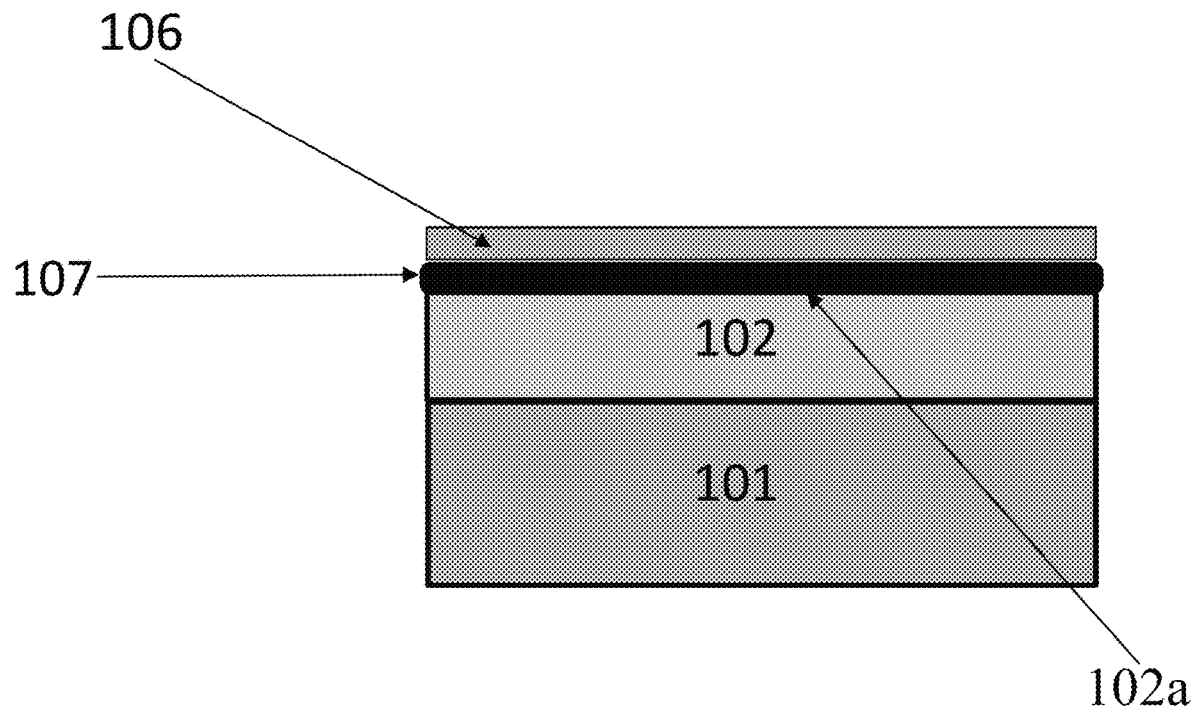

Please refer to FIG. 2G. FIG. 2G shows a cross-section view of a winding turn of the plurality of winding turns 101 and the shielding layer 102, wherein the insulating layer 107 is disposed on a top surface of the shielding layer 102, and the conductive part 106 is disposed on the insulating layer 107, wherein one end of the conductive part 106 can be used to electrically connect to the second terminal 101*b* and the other end of the conductive part 106 can be used to electrically connect with the second electrode 101*e* of the inductor.

Figure 2H:
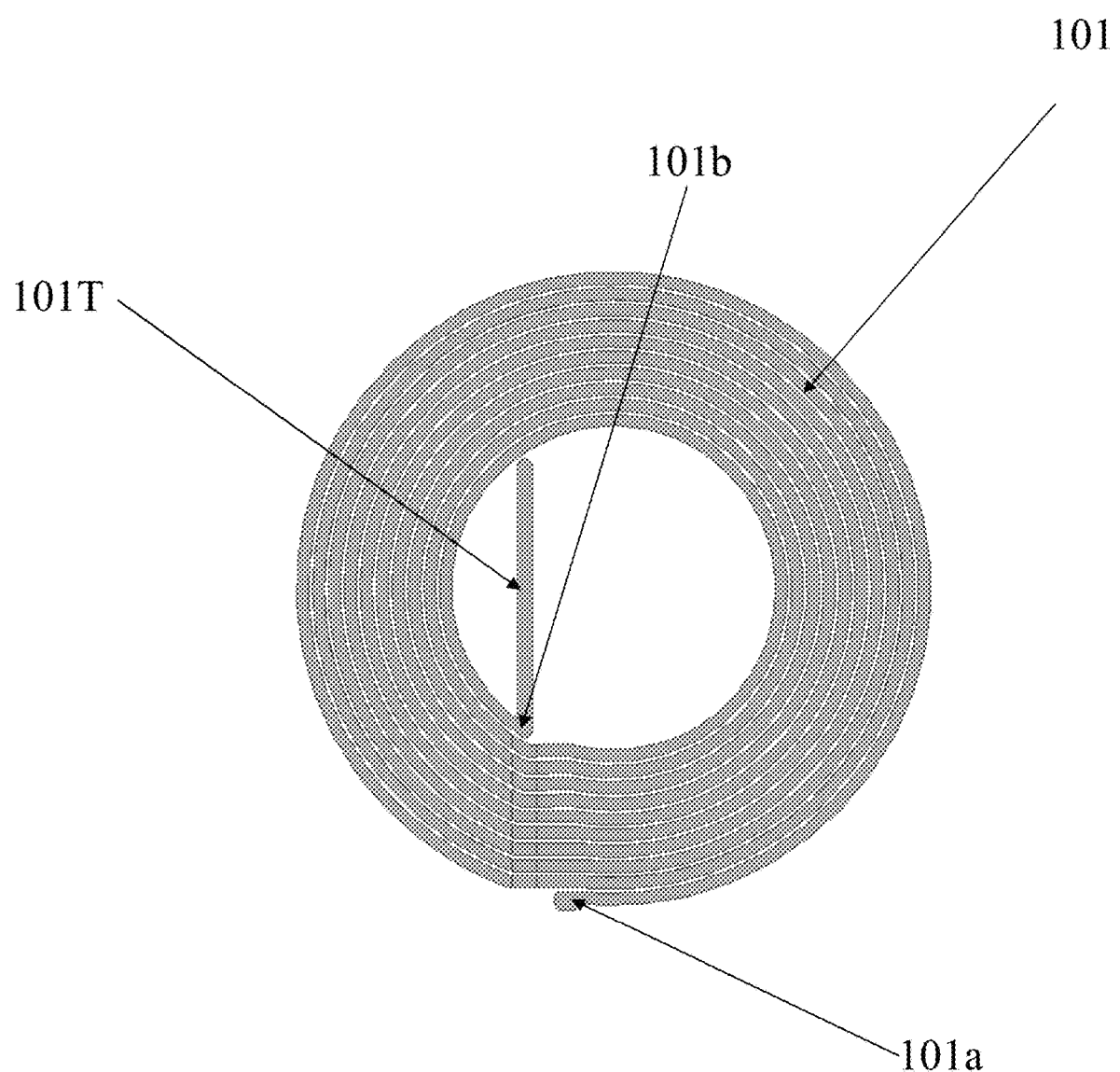
FIG. 2H illustrates an extended terminal part of the coil to connect the inner ending part of the coil to the corresponding electrode without using the recess shown in FIG. 2A according to another embodiment of the present invention.
Figure 3:
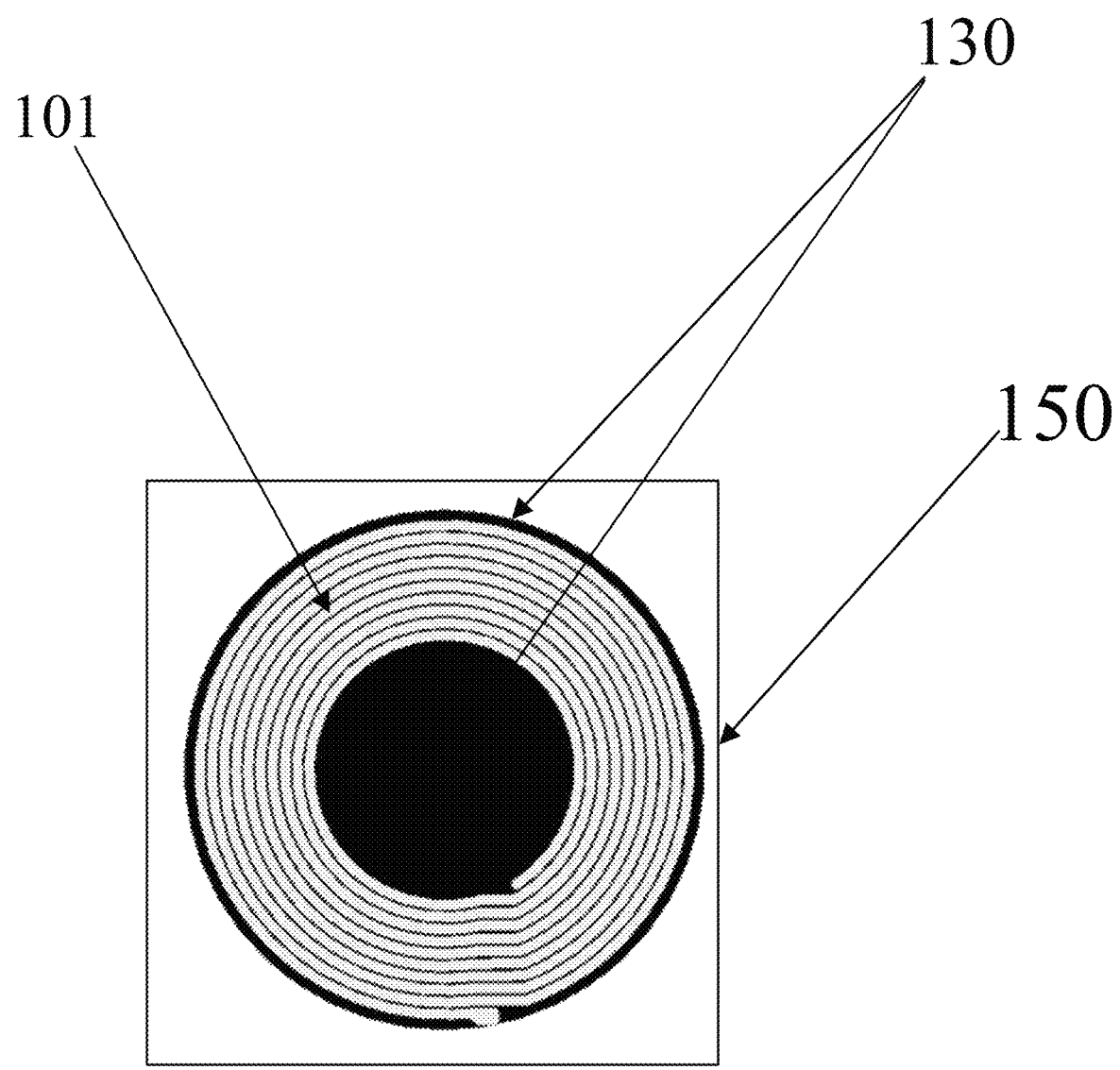
FIG. 3 depicts an inductor according to one embodiment of the present invention.

FIG. 2H illustrates an extended terminal part 1011 of the coil, which can be used as the conductive part 106 in FIG. 2B to FIG. 2E so that there is no need to use another separated conductive part for connecting the inner ending part of the coil 101*b* to a corresponding electrode outside the plurality of the winding turns 101:

FIG. 3 shows the shielding layer and the coil are encapsulated by a magnetic body or an encapsulating layer. In one embodiment, as shown in FIG. 3, a magnetic body or an encapsulating layer 130 is used to encapsulate the shielding layer and the plurality of winding turns 101 of a coil, wherein the magnetic body or the encapsulating layer 130 extends into the hollow space of the coil. In one embodiment, the magnetic body or the encapsulating layer 130 comprises ferrite. In one embodiment, an adhesive material 150 encapsulates the coil, the shielding layer 102 and the magnetic body or the encapsulating layer 130 for protecting the inductor.

FIG. 4 shows a flow chart of a method for forming an inductor, wherein the method comprises: a step 401: removing unwanted portions of a metal plate to form a coil comprising a plurality of winding turns of the coil; and a step 402: forming a shielding layer comprising a first conductive and magnetic material to encapsulate each of the plurality of winding turns of the coil. In one embodiment, the method further comprises a step 403: forming a molding body or an encapsulating layer comprising a second magnetic material to encapsulate the plurality of winding turns of the coil and the shielding layer.

FIG. 5 shows a chart to compare an inductor without the shielding layer with an inductor that is coated with the shielding layer made of nickel. One can see that the DCR and ACR of the inductor coated with the shielding layer are respectively lower than that of the conventional inductor without a shielding layer; and the Q value of the inductor coated with the shielding layer is greater than that of the conventional inductor without a shielding layer.

Figure 6:
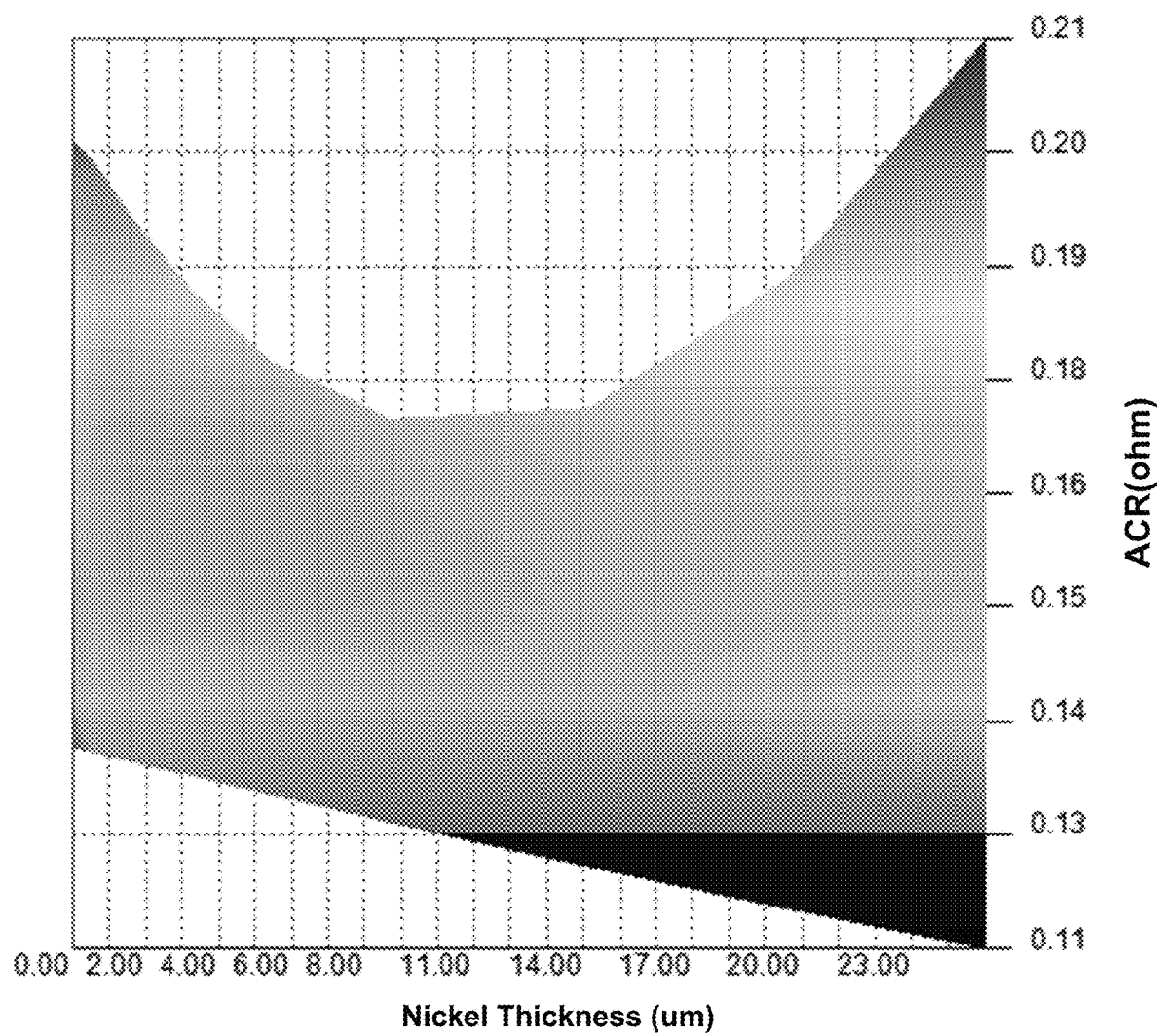
FIG. 6 illustrates a chart to show the relationship between the thickness of the shielding layer made of nickel and the ACR according to another embodiment of the present invention.

FIG. 6 shows a chart to show the relationship between the thickness of the shielding layer made of nickel and the ACR. One can see that the thickness of the shielding layer, such as nickel layer, can influence the ACR of the inductor, and the thickness of the shielding layer has the optimized range for a particular operating frequency of the inductor. In one embodiment of the present invention, the shape of a cross-section of each winding turn in the thickness direction of the coil is rectangular.

Please note that for a given operating frequency, one can find an optimized thickness range to reduce the ACR of the inductor. In one embodiment of the present invention, the inductor is used in a wireless charger, wherein the operating frequency of the inductor ranges from 100 kHz to 400 KHz.

In one embodiment of the present invention, the thickness of the shielding layer is in a range of 1.5 um to 15 um.

In one embodiment of the present invention, the thickness of the shielding layer is in a range of 1.5 um to 10 um.

In one embodiment of the present invention, the thickness of the shielding layer is in a range of 10 um to 14 um.

In one embodiment of the present invention, the thickness of the shielding layer made of nickel (Ni) is in a range of 1.5 um to 15 um, wherein the operating frequency of the inductor ranges from 100 kHz to 400 KHz.

In one embodiment of the present invention, the thickness of the shielding layer made of nickel (Ni) is in a range of 1.5 um to 10 um, wherein the operating frequency of the inductor ranges from 100 kHz to 400 KHz.

In one embodiment of the present invention, the thickness of the shielding layer made of nickel (Ni) is in a range of 10 um to 14 um, wherein the operating frequency of the inductor ranges from 100 kHz to 400 KHz.

Figure 7A:
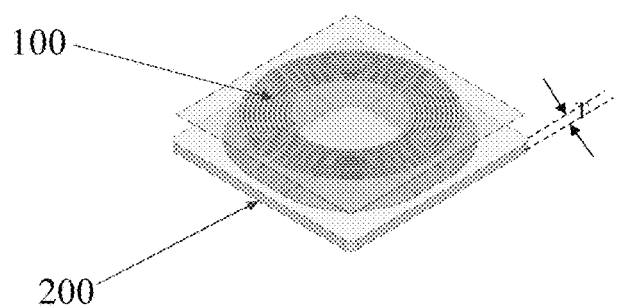
FIGS. 7A-7C illustrate that a plurality of separated graphene sheets are disposed over the bottom surface of a coil of an inductor to reduce eddy currents according to another embodiment of the present invention.

FIG. 7A illustrates that a graphene sheet 200 is disposed over the bottom surface of the inductor.

Figure 7B:
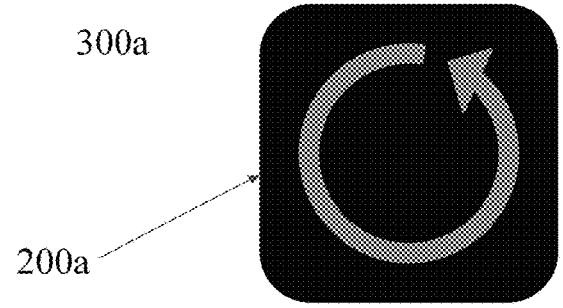

FIG. 7B illustrates that a contiguous graphene sheet 200*a* is disposed over the bottom surface of the coil with larger eddy currents.

Figure 7C:
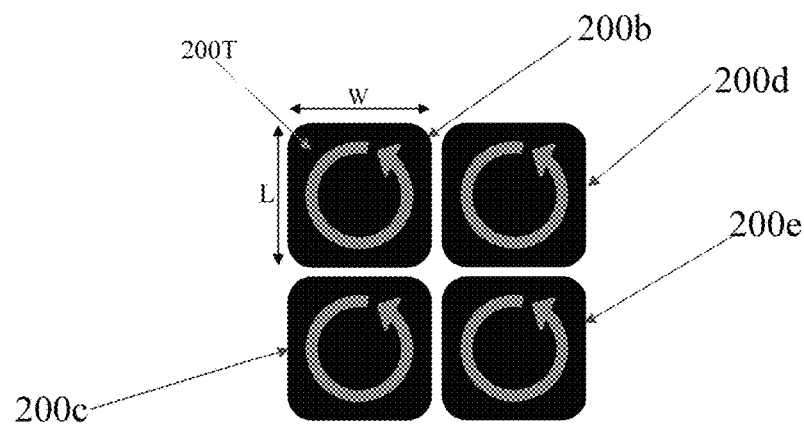

FIG. 7C illustrates that a plurality of separated graphene sheets 200*b*, 200*c*, 200*d*, 200*e* are disposed over the bottom surface of the inductor with smaller eddy currents, wherein a gap is between each two adjacent graphene sheets. In one embodiment, there are four graphene squares over the bottom surface of the coil. In one embodiment, a vertical straight line passes the center of the coil and the gap between the plurality of separated graphene sheets. As shown in FIGS. 7A and 7C, a top surface 200T of a first graphene sheet 200*b* is facing the shielding layer, wherein a thickness T of the first graphene sheet 200*b* measured from the top surface 200T of the first graphene sheet 200*b* to a bottom surface of the first graphene sheet 200*b* is respectively less than a length L of the first graphene sheet 200*b* and a width W of the first graphene sheet 200*b*.

The following Table 1 compares the original structure without adding graphene sheets, the original structure with a contiguous graphene sheet, and the original structure with four separated graphene sheets disposed over the bottom surface of an inductor. As shown in Table 1, the original structure with the four separated graphene sheets can increase the efficiency of the inductor.

TABLE 1

| | Efficiency (%) | | |
|---|---|---|---|
| Iout (A) | Original | Graphite | Graphite square |
| 0.2 | 70.97 | 65.69 | 70.03 |
| 0.4 | 81.26 | 79.45 | 79.85 |
| 0.6 | 85.25 | 82.70 | 85.08 |
| 0.8 | 86.67 | 84.51 | 86.53 |
| 1 | 87.02 | 85.39 | 86.96 |
| 1.2 | 86.74 | 85.44 | 86.77 |

The present invention has many advantages: (1) a shielding layer that is made of a conductive and magnetic material encapsulates the metal wire of a coil so as to shield the coil from the external magnetic field and make the resistance or the ACR of the coil lower; (2) two electrodes of the inductor that are electrically connected with two ending parts of the coil and can be placed side by side outside the coil for electrically connecting with an external circuit easily; (3) a plurality of separated graphene sheets that can be disposed over the bottom surface of the inductor to reduce eddy currents and power loss of the inductor.

Although the present invention has been described with reference to the above embodiments, it will be apparent to one of ordinary skill in the art that modifications to the described embodiment may be made without departing from the spirit of the invention. Accordingly, the scope of the invention will be defined by the attached claims, not by the above-detailed descriptions.

What is claimed is:

1. An electronic device, comprising:
   a coil, wherein the coil is formed by a bare metal wire and comprises a plurality of winding turns arranged along a horizontal direction; and
   a shielding layer having a unitary body, wherein the unitary body of the shielding layer comprises a first conductive and magnetic material to encapsulate each winding turn of the plurality of winding turns of the coil, wherein a recess is formed in the unitary body of the shielding layer, wherein an inner terminal part of the bare metal wire is disposed in said recess formed in the unitary body of the shielding layer, wherein said recess has a first sidewall, a second sidewall that is opposite to the first sidewall, and a bottom surface connecting the first sidewall and the second sidewall, wherein an insulating layer is disposed in said recess and encapsulates said inner terminal part of the bare metal wire, wherein a first portion of the insulating layer is in contact with the entire first sidewall of said recess, a second portion of the insulating layer is in contact with the entire second sidewall of said recess, and a third portion of the insulating layer is in contact with the entire bottom surface of said recess.

2. The electronic device according to claim 1, wherein a thickness of a winding turn of the coil is in a range of 50 um to 100 um, wherein a thickness of the shielding layer is in a range of 1.5 um to 15 um.

3. The electronic device according to claim 1, wherein the first conductive and magnetic material comprises nickel (Ni).

4. The electronic device according to claim 1, wherein the first conductive and magnetic material is made of nickel (Ni).

5. An electronic device, comprising:
   a coil, wherein the coil is formed by a conductive wire and comprises a plurality of winding turns arranged along a horizontal direction; and
   a shielding layer having a unitary body, wherein the shielding layer comprises a first conductive and magnetic material to encapsulate each winding turn of the plurality of winding turns arranged along said horizontal direction, wherein a plurality of separated graphene sheets are placed under the unitary body of the shielding layer to reduce eddy currents, wherein an entirety of each of the plurality of separated graphene sheets is located under the unitary body of the shielding layer, wherein a top surface of a first graphene sheet is facing the shielding layer, wherein a thickness of the first graphene sheet measured from the top surface of the first graphene sheet to a bottom surface of the first graphene sheet is respectively less than a length of the first graphene sheet and a width of the first graphene sheet.

6. The electronic device according to claim 5, wherein a thickness of a winding turn of the coil is in a range of 50 um to 100 um, wherein a thickness of the shielding layer is in a range of 1.5 um to 15 um.

7. The electronic device according to claim 5, wherein the first conductive and magnetic material comprises nickel (Ni).

8. The electronic device according to claim 5, wherein the first conductive and magnetic material is made of nickel (Ni).

* * * * *